United States Patent

[11] 3,603,730

[72] Inventors John W. Weigl
Webster, N.Y.;
Hazen L. Hoyt, III, Glendora, Calif.

[21] Appl. No. 831,058
[22] Filed June 6, 1969
[45] Patented Sept. 7, 1971
[73] Assignee Xerox Corporation
Rochester, N.Y.

[54] PHOTORECEPTOR ASSEMBLY
9 Claims, 3 Drawing Figs.

[52] U.S. Cl. .178/7.1, 178/7.6, 250/211, 250/219, 338/15, 338/19
[51] Int. Cl. H04n 1/04
[50] Field of Search 178/7.1, 7.2, 5; 338/15, 17, 19; 250/228, 219 I, 211

[56] References Cited

UNITED STATES PATENTS

| | | | |
|---|---|---|---|
| 2,277,013 | 3/1942 | Carlson | 178/5 |
| 2,792,447 | 5/1957 | Kazan | 338/15 |
| 2,830,114 | 4/1958 | Carlson | 178/7.1 |
| 3,056,136 | 9/1962 | MacGriff | 338/19 |
| 3,087,069 | 4/1963 | Mongrieff-Yeates | 250/228 |
| 3,194,967 | 7/1965 | Mash | 250/211 |

OTHER REFERENCES

Keller, " Storage Device Using Phosphors," IBM Technical Disclosure Bulletin, Vol 1, No I June 1958

*Primary Examiner*—Richard Murray
*Assistant Examiner*—Peter M. Pecori
*Attorneys*—James J. Ralabate, John E. Beck and Benjamin B. Sklar

ABSTRACT: A photoreceptor assembly wherein a sandwich structure of electrode-photoconductor-electrode is positioned adjacent a document to receive reflections therefrom as a scanning beam passing through an elongated slot in the structure is swept across the document which is moved in a direction transverse to the slot.

INVENTORS
JOHN W. WEIGL
HAZEN L. HOYT, III
BY John E. Beck
ATTORNEY

PHOTORECEPTOR ASSEMBLY

The present invention relates generally to facsimile scanners, and more specifically, to photoreceptor assemblies used in detecting light reflections from graphic material.

Prior art scanners used in facsimile applications have employed various optical apparatus for collecting light reflections from sequential scan lines of a document or graphic material. Generally, this scan line has what can be referred to as a horizontal dimension equal to the width of the document and a vertical width equal to the corresponding dimension of the exploring light beam. This beam may have its source in a flying spot scanner, galvanometer mirror, or other line-by-line optical scanner. The significant aspect is that the reflected light, amplitude modulated by the reflectivity of the graphic material being scanned, originates sequentially from successive elemental areas along the scan line. This information-bearing light must be collected and directed to some type of photoreceptor which will convert the varying light intensity into a varying electrical signal which can be ultimately transmitted to generate a facsimile at a receiver of the original document being scanned. The collection of the reflected light is typically achieved by an optical assembly which must register the collected light on a relatively small area of the photoreceptor, such as a photomultiplier or photodiode. Because the light to be collected is reflected from every point across the width of the document being scanned, registering the reflected light with uniform efficiency on the photoreceptor is difficult if not impossible. The impredictable surface variations in the various kinds of documents expected to be encountered in a facsimile system create varying and diffuse reflections which can also contribute to the problem of registration of reflected light.

Prior art attempts to solve some of the problems in facsimile scanning have employed fiber optic arrays to collect and direct the reflected light. However, light loss and variations in optical characteristics of the arrays have been significant enough to render these solutions incomplete.

It is therefore an object of the present invention to improve scanning in facsimile systems.

It is also an object of the present invention to improve photoreceptor assemblies used in facsimile systems.

Another object of the present invention is to provide an improved photoreceptor assembly which provides uniform light collection from a scan document.

These and other objects which may become more apparent may be more fully appreciated along with other advantages of the present invention when the following detailed description is read in connection with the attached drawings wherein.

Figure 1:
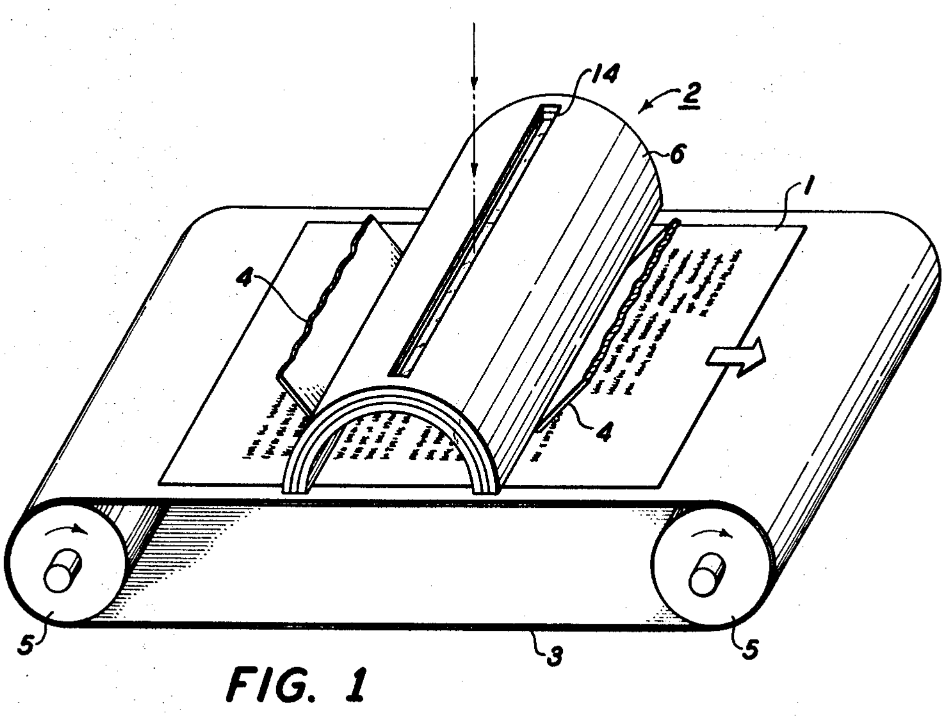
FIG. 1 is a perspective view of the photoreceptor of the present invention.
Figure 2:
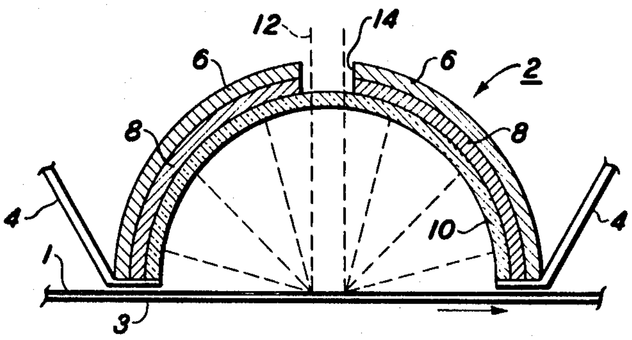
FIG. 2 is a cross-sectional view of the photoreceptor of FIG. 1.

Reference will now be made to FIGS. 1 and 2 which show one embodiment of the present invention. Generally, in facsimile scanners it is necessary to move the document to be scanned rather than moving the scanner or the exploring beam in both a vertical and horizontal direction as the document remains stationary. Therefore, as shown in FIG. 1, the document 1 to be scanned is moved at a predetermined constant rate in a direction indicated by the arrow, for example, by a conveyor belt 3 entrained about and driven by rollers 5. This movement sequentially passes elemental areas of the document's information bearing side past a scanning zone located beneath the concave portion of the photoreceptor assembly 2. As FIG. 1 shows, the photoreceptor assembly 2 preferably extends at least coextensively with the dimension of the document being scanned which is substantially perpendicular to the direction of motion of the document. Of course, it may be desirable to have the long dimension of this photoreceptor assembly 2 greater than the effective scanning dimension of the document 1 to insure efficient reflected light detection at the edges of the document.

The photoreceptor assembly 2 has a cross-sectional configuration substantially similar to a semicircle. However, the shape of a cross-sectional configuration could vary to the extent of being substantially parallel to the surface being scanned. As will be seen in more detail hereinafter this configuration is not as desirable as the one illustrated in the drawings.

Basically, the photoreceptor assembly 2 is supported in operative relationship with the document 1 to be scanned by means of two insulative supports 4 which are only shown in FIG. 2. These support structures provide a flange upon which the edges parallel to the axis of the photoreceptor assembly may rest. The assembly 2 is a three layer structure comprising a preferably opaque conductive layer 6, a photoconductive layer 8 and a transparent conductive layer 10 between the photoconductive layer 8 and the document being scanned.

The requirement of the transparency of layer 10 is obvious when FIG. 2 is viewed since scanning illumination designated generally by reference numeral 12 which passes through the photoreceptor assembly at slot 14 is reflected from the surface of document 1 and receive by the photoconductive layer 8 via the transparent conductive electrode 10. It is desirable that the electrode 6 be opaque or otherwise shielded to isolate the photoconductive layer 8 from ambient illumination and reflective to increase the efficiency of light utilization.

Although the slot 14 apparently divides the photoreceptor assembly into two halves this need not actually be the situation since, as shown in FIG. 1, both sides of the conductive layer 6 form a unitary electrode, electrically integral, while as shown best in FIG. 2 the transparent conductive electrode may be a continuous partial cylinder and permits the scanning illumination 12 to pass through it toward the document.

Figure 3:
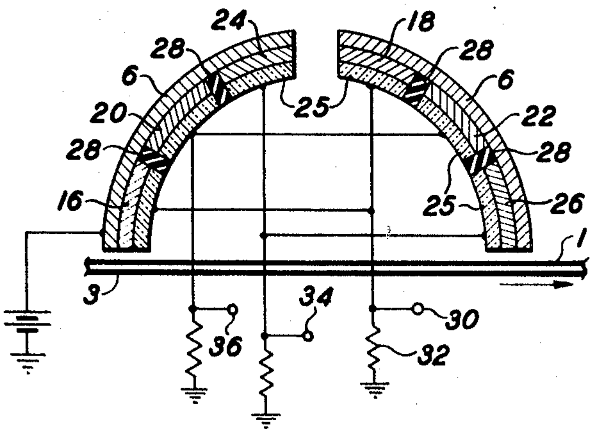
FIG. 3 is an alternative embodiment of the photoreceptor of the present invention adapted for color rendition.

A suitable source of electric potential can be supplied across the photoconductive layer by means of connecting the potential between the two conductive layers 6 and 10 as shown in FIG. 3 which will be described in more detail hereinafter.

It should be understood that if desirable or necessary the transparent electrode 10 could be eliminated at the slot 14 to provide a completely free path between the scanning light source and the document to be scanned. In that alternative situation, the conductive electrode 10 would bridge the slot only at the extreme ends thereof (as does electrode 6) which would not interfere with the sweep of the scanning illumination.

The photoconductive layer 8 may be made from any suitable photoconductive materials. Typical photoconductive materials include selenium, selenium alloys with tellurium and/or arsenic, cadmium sulfide, cadmium selenide, and plastic or vitreous binder suspensions of any of these. The transparent conductive layer 10 may be formed from Nesa glass, or tin oxide while the opaque conductive layer 6 could be made from any one of several suitable materials. The transparent conductive layer may be deposited on the surface of the photoconductive layer by known processes of evaporation.

As seen in FIGS. 1 and 2, the photoreceptor assembly of the present invention is such as to maximize the collection of the light reflected from the surface of the moving document being scanned. In addition, the reflected light-receiving surfaces of the photoreceptor assembly are sufficiently remote from the paper as not to become contaminated by light obstructing particles emanating from the moving document. Furthermore, it can be appreciated that, through utilization of the photoreceptor structure of the present invention, the assembly itself does not obstruct or in any way alter the maximum efficiency of the scanning beam in terms of illumination level or resolution. Furthermore, while the slot 14 is illustrated as being aligned with a plane perpendicular to the scanned document the slot may also be off this perpendicular to take advantage of the specular characteristics of the surface of the particular documents being scanned.

Since the diffuse reflected light theoretically is reflected in all directions within the photoreceptor enclosure in accordance with well known Lambert's law, the present invention makes possible a very efficient and reliable color photoreceptor. This color responsive assembly may take the form as illustrated in FIG. 3 wherein the photoconductive layer is segmented in different sections which may comprise different photoconductors having particular color responses, and optionally be covered by strips of different color filters. For example, the strips of photoconductive material may be such that beginning at one edge of the photoreceptor assembly and moving to the other edge a sequence of three color-responsive photoconductors is repeated. Photoreceptor strips 16 and 18 may be responsive only to reflected light in the blue wavelength range, photoconductive strips 20 and 22 may be responsive primarily or selectively to green reflected light, while the remaining two photoconductive strips 24 an 26 may be responsive primarily to red reflected light from the document 1. The opaque conductive electrode 6 may take the same form as it did in the embodiment of FIG. 2, while the transparent conductive layer 10 is in the form of a plurality of electrically insulated strips, each substantially coextensive in area with a respective strip of photoconductive material. Suitable dielectric dividers 28 may be supported by the opaque electrode 6 to electrically insulate adjacent photoconductive strips and their respective transparent electrode layers. The pairs of transparent conductive strips associated with those photoconductive strips identified with one particular color are electrically coupled together and via a suitable electrical resistance to a suitable reference potential, such as ground, with an output terminal associated with the nonreference potential side of the resistance. As shown in FIG. 3, output terminal 30 is electrically connected to a pair of transparent conductive strips so as to generate a signal across resistor 32 as a function of the intensity of the particular wavelength of light detected by photoconductive strips 16 and 18. Output terminals 34 and 36 function in a similar manner in connection with the particular light received or detected by strips 24 and 26 and strips 20 and 22, respectively.

It can further be appreciated from the description of FIG. 3 that the orientation of the particular color-responsive photoconductors may be varied to correspond with other types of geometries. For example, beginning with strip 16 the color responsiveness going around the photoreceptor assembly could be identified as blue, green, red, red, green and blue. Of course, the electrical connections to the output terminals 30, 34, and 36 would have to be altered so that the transparent electrodes associated with one particular color-responsive strip were connected in common.

In addition the embodiment of FIG. 3 could also include in each conductive strip 25 a selective color filter to improve color separation. Such filters could be used in conjunction with both selective color responsive photoconductors or panchromatic photoconductors.

There may be certain applications where the cavity created by the concavity of the photoreceptor assembly of the present invention presents a problem in paper handling or document manipulation such that it would be desirable to fill in this cavity with an optically neutral material. Such a step would be compatible with the concepts of the present invention. Furthermore, while FIG. 3 shows two sets of three strips, additional sets of strips could also be used depending on physical size of the photoreceptor assembly.

From the description herein, other photoreceptor configurations are possible within the scope of the present invention. A structure having two substantially flat surfaces meeting at a vertex where the slot 14 may be appropriately located. Such a structure would then form a cavity between itself and a document to be scanned.

It may be appreciated that the present invention is compatible with any type of beam scanning apparatus.

While the invention has been described with reference to a preferred embodiment, it will be understood by those skilled in the art that various changes may be made and equivalents may be substituted for elements thereof without departing from the true spirit and scope of the invention.

What is claimed is:

1. A photoreceptor scanning assembly for use in a document scanning system comprising:
   a. an arcuate electrode having a surface substantially forming a concavity defined by two linear edges and two arcuate edges and having a slot with two edges substantially parallel to said linear edges,
   b. photoconductive material on said surface proximate to said slot, and
   c. a transparent conductive layer on and coextensive with said photoconductive material.

2. A photoreceptor scanning assembly for collecting light reflected from a document when scanned by a light beam comprising:
   a. an opaque conductive electrode having an elongated scanning slot adapted to permit a light beam to pass therethrough,
   b. photoconductive material on said electrode and
   c. a transparent conductive material on and coextensive with said photoconductive material.

3. An assembly as defined in claim 2 wherein said photoconductive material on said electrode is on at least two sides of said slot and the portion of said photoconductive material closest to said slot is more remote from a document to be scanned than is the portion of said photoconductive material remote from said slot.

4. An assembly as defined in claim 2 wherein said opaque electrode is arcuate with a concave surface and wherein said photoconductive material is on said surface.

5. An assembly as defined in claim 2 wherein said photoconductive material is formed in a plurality of elongated strips having their longer dimension parallel to said slot, the photoconductive material of any one strip being exclusively responsive to a particular wavelength of reflected light and the conductive material on any one of said strips being electrically insulated from the conductive material on adjacent strips.

6. A document scanning system comprising:
   a. means for moving in a predetermined direction a document to be scanned through a scanning zone;
   b. a photoreceptor structure including an opaque electrode, a photoconductive layer, and a transparent conductive layer in that order and having an elongated slot therein with one dimension at least substantially equal to the dimension of the document to be scanned in a direction perpendicular to said predetermined direction;
   c. support means for positioning said photoreceptor structure proximate to a document to be scanned with said opaque electrode more remote therefrom than said transparent layer and with said slot substantially perpendicular to said predetermined direction.

7. A system as defined in claim 6 wherein said photoreceptor structure is configured to form a cavity between it and said document to be scanned.

8. A system as defined in claim 7 wherein said cavity is concave.

9. A system as defined in claim 6 wherein said photoconductive layer is divided into a plurality of strips substantially parallel to said slot and each strip being responsive to only reflected light from said document of a particular wavelength and said transparent layer being divided into a number of insulated strips equal to said plurality with each transparent strip being coextensive with one of said photoconductive strips.